US012793221B2

(12) United States Patent
Ippolito et al.

(10) Patent No.: US 12,793,221 B2
(45) Date of Patent: Nov. 10, 2026

(54) SYSTEMS AND METHODS FOR PIXEL DETECTION

(71) Applicant: Life Technologies Corporation, Carlsbad, CA (US)

(72) Inventors: Kim Anthony Ippolito, South Park, PA (US); Austin C. Kearns, Eugene, OR (US); Nicolas Rognin, Bothell, WA (US); Laurence Roger Rystrom, Bothell, WA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 430 days.

(21) Appl. No.: 18/588,747

(22) Filed: Feb. 27, 2024

(65) Prior Publication Data

US 2024/0289957 A1 Aug. 29, 2024

Related U.S. Application Data

(60) Provisional application No. 63/487,473, filed on Feb. 28, 2023.

(51) Int. Cl.

| | |
|---|---|
| ***G06V 20/69*** | (2022.01) |
| ***G06T 7/00*** | (2017.01) |
| ***G06T 7/246*** | (2017.01) |

(52) U.S. Cl.

CPC ............ *G06T 7/0014* (2013.01); *G06T 7/248* (2017.01); *G06V 20/698* (2022.01); (Continued)

(58) Field of Classification Search

CPC .................. G06T 7/0014; G06T 7/248; G06T 2207/10016; G06T 2207/20072; (Continued)

(56) References Cited

U.S. PATENT DOCUMENTS

| | | | |
|---|---|---|---|
| 7,912,259 | B2 | 3/2011 | Arditi et al. |
| 8,014,625 | B2 | 9/2011 | Dewaele |

(Continued)

FOREIGN PATENT DOCUMENTS

| | | | |
|---|---|---|---|
| CN | 114574366 | A | 6/2022 |
| CN | 115273077 | A | 11/2022 |

(Continued)

OTHER PUBLICATIONS

International Search Report and Written Opinion of the International Searching Authority issued in International Patent Application No. PCT/US2024/017483 dated Jun. 14, 2024.

(Continued)

*Primary Examiner* — Juan M Guillermety

(57) ABSTRACT

Aspects of the subject technology provide improved pixel detection techniques including improvements to motion detection and processing resource conservation. Improved techniques include determining a metric of mutual information between a pair of images from a sequence of images of a biological sample, detecting a motion of the biological sample based on the metric of mutual information, and, after the motion is detected, performing a measurement of the biological sample based on a test image of the sequence of images.

20 Claims, 4 Drawing Sheets

(52) U.S. Cl.
CPC ............... *G06T 2207/10016* (2013.01); *G06T 2207/20072* (2013.01); *G06T 2207/20076* (2013.01); *G06T 2207/30024* (2013.01)

(58) Field of Classification Search
CPC . G06T 2207/20076; G06T 2207/30024; G06T 7/0016; G06T 7/20; G06V 20/698; G06V 10/42; G06V 10/50; G06V 10/62; G06V 10/758; G06V 20/44; G06V 20/693; G06V 20/70; G06V 20/695; G06F 18/21342
See application file for complete search history.

(56) References Cited

U.S. PATENT DOCUMENTS

| | | | |
|---|---|---|---|
| 8,131,476 | B2 | 3/2012 | Cline et al. |
| 8,369,600 | B2 * | 2/2013 | Can ........................ G01N 1/312 382/128 |
| 8,645,294 | B1 | 2/2014 | Owechko et al. |
| 9,224,199 | B2 | 12/2015 | Sakamoto et al. |
| 9,251,585 | B2 | 2/2016 | Azar et al. |
| 9,282,944 | B2 | 3/2016 | Fallavollita et al. |
| 10,222,215 | B2 | 3/2019 | Holz |
| 10,416,433 | B2 | 9/2019 | Matsumoto |
| 10,733,417 | B2 | 8/2020 | Gertych et al. |
| 11,024,044 | B2 | 6/2021 | Miecznik |
| 11,125,752 | B2 | 9/2021 | Mir et al. |
| 11,360,197 | B2 | 6/2022 | Sutavani et al. |
| 11,443,415 | B2 | 9/2022 | Mizunaka |
| 11,460,405 | B2 | 10/2022 | Espinoza Vallejos et al. |
| 11,708,563 | B2 | 7/2023 | Wagner et al. |
| 12,223,751 | B2 * | 2/2025 | Li .......................... G06V 20/69 |
| 2013/0194410 | A1 | 8/2013 | Topman et al. |
| 2016/0203165 | A1 | 7/2016 | Tanikawa et al. |
| 2020/0339939 | A1 | 10/2020 | Iga et al. |
| 2020/0353691 | A1 | 11/2020 | Martinez et al. |
| 2021/0380910 | A1 | 12/2021 | Chen et al. |
| 2022/0051404 | A1 | 2/2022 | Zhang et al. |
| 2022/0254024 | A1 | 8/2022 | Castro-Gonzalez et al. |
| 2022/0284719 | A1 | 9/2022 | Amthor et al. |
| 2022/0327848 | A1 | 10/2022 | Ye et al. |
| 2022/0392613 | A1 | 12/2022 | Aifuwa et al. |
| 2023/0065504 | A1 | 3/2023 | Wagner et al. |
| 2023/0108453 | A1 | 4/2023 | Amthor et al. |
| 2023/0306761 | A1 | 9/2023 | Sirbulescu et al. |
| 2023/0341329 | A1 | 10/2023 | Johnson et al. |

FOREIGN PATENT DOCUMENTS

| | | | |
|---|---|---|---|
| EP | 2 617 011 | A1 | 7/2013 |
| WO | 2012/035504 | A1 | 3/2012 |

OTHER PUBLICATIONS

Sasse, “Mutual information based parameter extraction for spreading cell colonies”, Doctoral thesis, 2021. https://miami.uni-muenster.de/Record/0588e288-b2f7-495f-8cdc-35b77493cf3e.

Moen, et al., “Deep learning for cellular image analysis”, Nature Methods, vol. 16, No. 12, pp. 1233-1246, 2019.

Meijering, et al., “Time-Lapse Imaging”, Microscope Image Processing, Ch. 15, pp. 401-440, Apr. 2008.

* cited by examiner

100

200

300

400

600

SYSTEMS AND METHODS FOR PIXEL DETECTION

CROSS-REFERENCE TO RELATED APPLICATIONS

This application claims benefit to U.S. Provisional Application No. 63/487,473, filed Feb. 28, 2023, the entirety of which is incorporated by reference herein.

TECHNICAL FIELD

The present disclosure relates generally to image processing and biological classification and measurements.

BACKGROUND

Pixel detection techniques generally involve analysis or measurement of a biological specimen based on a digital—e.g., pixel-based-image captured of a biological sample. For example, a biological specimen may be mounted in a microscope capable of capturing digital images or video, and the resulting digital images may be analyzed in order to classify or otherwise measure the biological specimen. Existing techniques, however, present certain shortcomings, e.g., comparatively high CPU usage. Accordingly, there is a need in the art for improved pixel detection techniques.

SUMMARY

In meeting the described long-felt needs, the present disclosure provides an image processing method comprising determining a metric of mutual information between at least a pair of images from a sequence of images of a biological sample, detecting a motion of the biological sample based on the metric of mutual information, and, after the motion is detected, performing a measurement of the biological sample based on a test image of the sequence of images.

Also provided is an image processing method comprising determining a metric of mutual information between at least a pair of images from a sequence of images of a biological sample, detecting a motion of the biological sample based on the metric of mutual information, and, after the motion is detected, performing a measurement of the biological sample based on a test image of the sequence of images.

Further provided is a non-transitory computer readable memory storing instructions that, when executed by a processor, cause the processor to determine a metric of mutual information between at least a pair of images from a sequence of images of a biological sample, detect a motion of the biological sample based on the metric of mutual information; and, after the motion is detected, perform a measurement of the biological sample based on a test image of the sequence of images.

BRIEF DESCRIPTION OF THE DRAWINGS

Certain features of the subject technology are set forth in the appended claims. For purpose of explanation, however, several implementations of the subject technology are set forth in the following illustrative, non-limiting figures.

DETAILED DESCRIPTION

Figure 1:
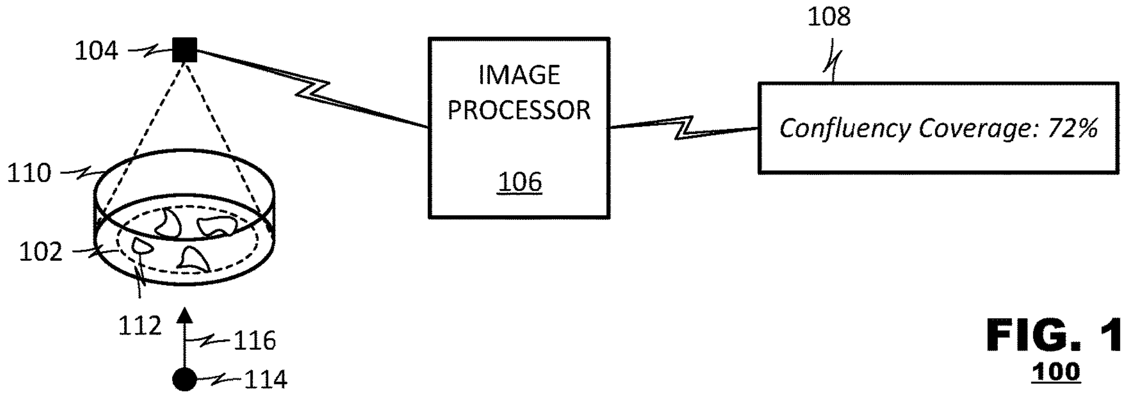
FIG. 1 illustrates an example image processing scenario.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. The subject technology is not, however, limited to the specific details set forth herein and can be practiced using one or more other implementations. In one or more implementations, structures and components are shown in block diagram form in order to avoid obscuring the concepts of the subject technology.

The present disclosure provides, inter alia, improved pixel detection techniques. General image processing techniques often do not work well on laboratory images of biological specimen, and hence techniques that are adapted to address such images may result in improved results. In particular, transmissive light images, where a primary light source positioned behind a specimen and a camera captures the light after it passes through the specimen as opposed to reflecting off of the specimen, and images of radiative specimen, where the specimen generates and radiates electromagnetic energy that is captured by a camera independent of any other light source, often do not work well with pixel detection or other image processing techniques designed for reflective light images where a primary light source is reflected off of a specimen. In addition, specimens having a substantial fluid component, or specimens submerged in a fluid medium, particularly when captured in transmissive images, may confuse traditional image processing techniques or otherwise render traditional techniques less effective.

In an aspect of the subject technologies presented here, mutual information can form a basis for improved techniques to identify motion or other changes in a biological specimen. For example, a metric of mutual information between two sequential images of a given image subject, such as a biological specimen, can be used to detect or measure motion or measure other changes in the subject that occurred between the capture times of the two images. Such motion can be, e.g., cellular expansion, cellular contraction, or cellular translational motion. Some examples of such other changes include, e.g., the increase or decrease of an amount of a cellular component or cellular product, movement of a cellular component within the cell, cellular replication, and the like. A metric of mutual information can be based on, for example, a measure of statistical independence between the two images or between corresponding pixels of the two images. Experimental results have shown that a mutual information metric can provide improved detection or classification or motion or other changes in images of a biological specimen. For example, a metric of mutual information can be relatively more sensitive to changes in a biological sample that are relevant some clinical applications, such as cell growth or movement, while being relatively less sensitive to other changes that less relevant, such as movement of a medium in which the biological sample is submerged.

In another aspect of the disclosed technology, a measure of motion or other changes in an image subject, such as biological specimen, can be used to improve the performance of biological measurements. For example, a resource intensive task, e.g., performing pixel detection method on a test image or any other resource intensive biological measurement, can be initiated when a motion or other change is detected in the biological specimen. In an aspect, a resource—such as computer processor or memory usage—can be conserved by foregoing the resource intensive task when a change is not detected.

An improved pixel detection technique can include determining a metric of mutual information between at least a pair of images from a sequence of images of a biological sample, detecting a motion of the biological sample based on the metric of mutual information, and after the motion is detected, performing a measurement of the biological sample, such as a confluency metric, based on a test image of the sequence of images. Such images can be, e.g., transmissive light images. In the improved techniques, (i) the techniques can include foregoing the performing of the measurement of the biological sample when the motion is not detected; (ii) the determining the metric of mutual information can comprise estimating a measure of statistical independence between co-located pixel values in the pair of images; (iii) the estimating the measure of a statistical independence can comprise determining a joint histogram of the co-located pixel values; (iv) the motion is detected when the metric of mutual information is passes a threshold level of mutual information; (v) the motion can be detected based on a plurality of metrics of mutual information, where each metric of the plurality between different pairs of images from the sequence of images; (vi) the performing a measurement of the biological sample can be delayed after the motion is detected until after the motion is no longer detected; and/or (vii) the performing the measurement of the biological sample can comprise processing the test image with a machine learning model to produce the measurement of the biological sample.

In a further aspect of the improved techniques, performing the measurement of the biological sample can comprise analyzing the test image from the sequence of images to produce a plurality of feature images; deriving, from the feature images, a likelihood image for each of a plurality of object types; and combining the likelihood images into a classification image indicating which of the plurality of object types are detected at each pixel in the classification image. An example biological measurement can include determining a confluency metric, and the improved techniques can include calculating the confluency metric for an object type based on a percentage of pixels in the classification image indicating the object type.

FIG. 1 illustrates an example image processing scenario 100. Scenario 100 includes a specimen 102 of cells 112 in a specimen container 110, a camera 104 configured to capture images of specimen 102, a light source 114, image processor 106, and display 108. Light source 114 can emit visible light or other electromagnetic radiation, and light source 114 can be positioned relative to the specimen 102 opposite the camera 104 such that emissions from light source 114 can radiate in direction 116 to pass through translucent or transparent portions of specimen 102 in order to be captured by a light sensor in camera 104. Image processor 106 can process one or more images of specimen 102 captured by camera 104 in order to produce a biological measurement of specimen 102, and the resulting measurement, such as a confluency measurement, can be presented to a user on display 108. In an aspect, the measurement presented on display 108 is updated only when the image processor detects a certain type of change in, or movement of, specimen 102. For example, if a user were to reposition specimen 102 relative to camera 104 such that camera 104 were to capture images of a different portion of specimen 102, the user may wish to have the biological measurement updated immediately. At other times, such as when the sample 102 is not being moved by an operator, the image processor 106 can forego updating the biological measurement in order to preserve resources used by image processor 106 at times when the biological measurement is less likely to have changed.

Figure 2:
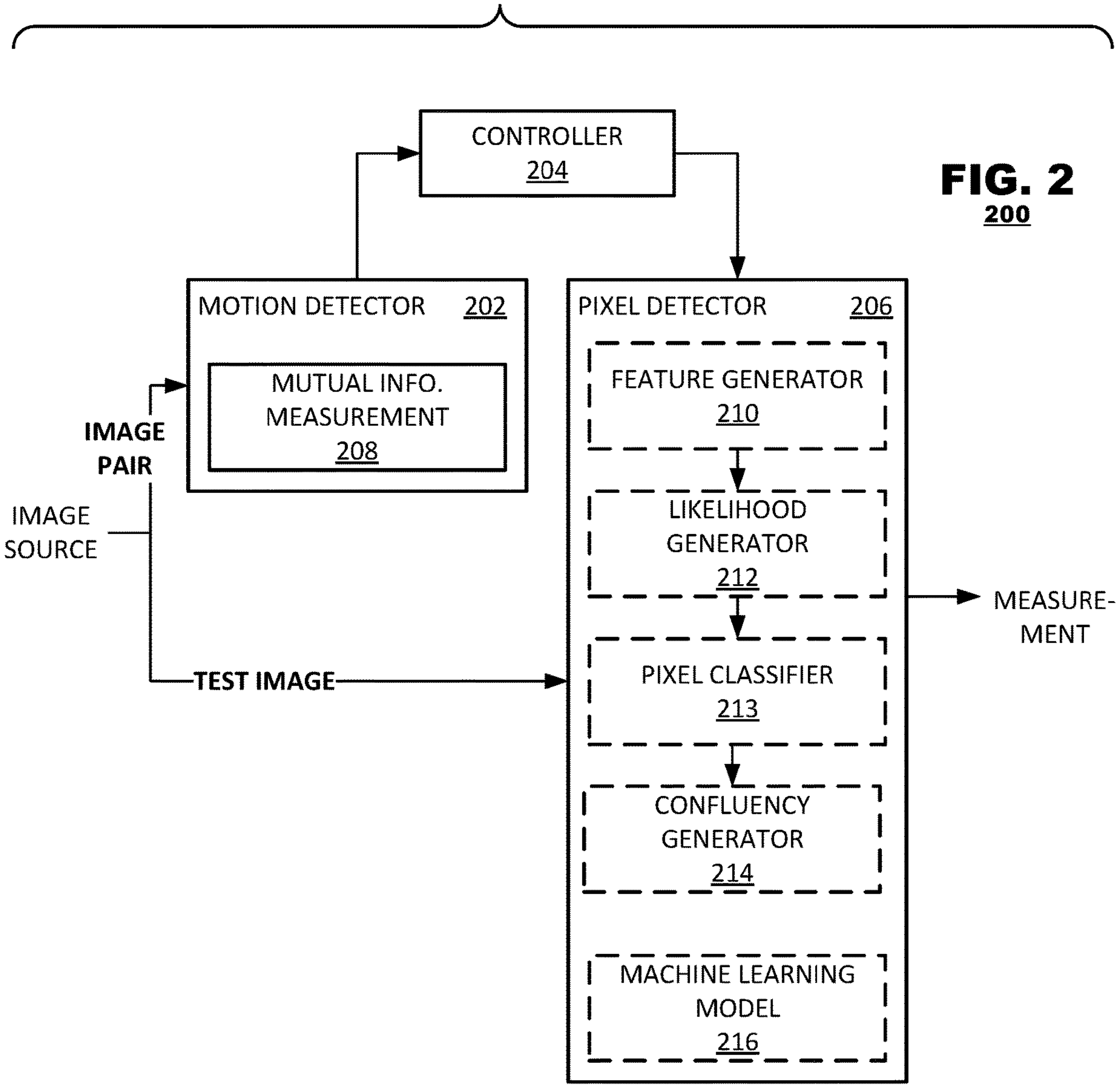
FIG. 2 illustrates an example image processing system according to aspects of the subject technology.

FIG. 2 illustrates an example image processing system 200 according to aspects of the subject technology. System 200 can be an example implementation of image processor 106 (FIG. 1). System 200 includes a motion detector 202, controller 204, and pixel detector 206. In operation, an image source can provide a sequence of images captured at different times. In an aspect, one or more images in the captured sequence of images can include the same image subject, such as the images of the same biological sample. Motion detector 202 can assess motion or other changes that occur between a pair of images from the image source. In an aspect the pair of images can be neighboring or sequential images from the image source, and in another aspect, the pair of image can be more temporally distant from each other and represent a bigger difference in image capture times. In an aspect, motion detector 202 can include a of mutual information measurement 208, and motion detector 208 can detect motion based on the measured mutual information. For example, the metric of mutual information may indicate a degree of motion that occurred between the capture times of the image pair, and a metric of mutual information may be normalized such as described below. In another example, motion may be detected with the metric of mutual information drops below a threshold level. Pixel detector 206 can perform a biological measurement of an image subject in a test image from the image source. In an aspect, the test image used by pixel detector 206 can be one of the image pair used by motion detector 202, such as the most recent of the pair. In another aspect, the test image used by pixel detector 206 can be different from the image in the image pair used by motion detector 207, for example the test image can be newer or more recent than either image in the image pair. Controller 204 can control performance of the biological measurements by pixel detector 206 based on motions detected by motion detector 202. For example, controller 204 can only initiate a biological measurement by pixel detector 206 when motion detector detects a certain amount of motion or quality of motion between an image pair.

In some optional aspects of system 200, pixel detector 206 can include one or more of feature generator 210, likelihood generator 212, pixel classifier 213, confluence generator 214, and one or more machine learning models 216. In one aspect, one or more machine learning models can analyze a test image to produce a measurement of the subject of the test image. In another aspect, feature generator 210, likelihood generator 212, pixel classifier 213, and confluence generator 214 can be used in combination to produce a measurement of the subject of the test image. In some implementations, feature generator 210, likelihood generator 212, pixel classifier 213, and/or confluence generator 214 can each individually include a machine learning model.

In another additional aspect, pixel detector 206 can produce a biological measurement such as confluency of a specimen captured in the test images. For example, a confluency metric of for the specimen can be determined by confluency generator 214 from the output of pixel classifier 214. A confluency metric can be determined as a ratio of counts of pixels with different classifications produced by the pixel classifier for an image. For example, a confluency metric can be determined as the ratio of a count of the number of pixels in a test image classified as a certain type of cell divided by the total number of pixels in the test image.

Figure 3:
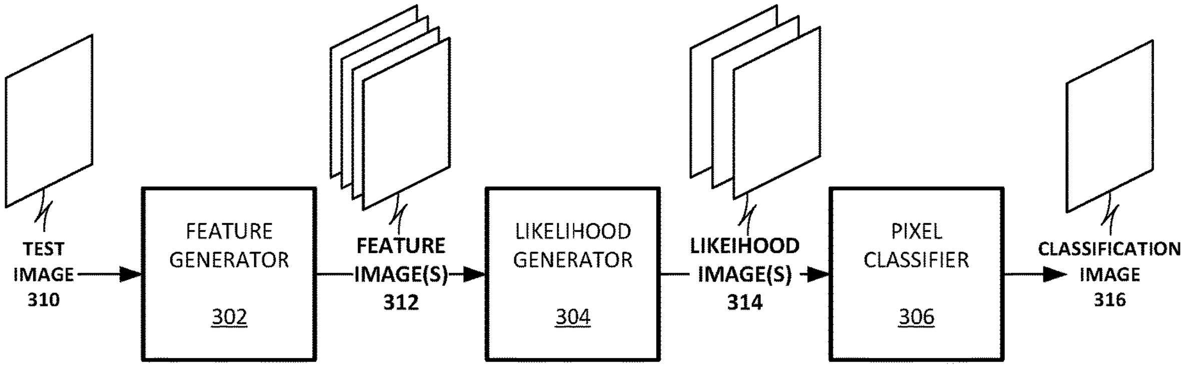
FIG. 3 illustrates an example pixel detection system according to aspects of the subject technology.

FIG. 3 illustrates an example pixel detection system 300 according to aspects of the subject technology. Pixel detection system 300 can be an example implementation of pixel detector 206 (FIG. 2). System 300 includes feature generator 302, likelihood generator 304, and pixel classifier 306. In operation feature generator 302 can produce one or more feature images 312 from a test image 310. Likelihood generator can generate one or more likelihood images 314 from the feature image(s) 312. Pixel classifier 306 can produce a classification image 316 based on the likelihood images 314.

Test image 310 can be, for example, an image from image source such as camera 104 (FIG. 1), and may be, for example, a color image with multiple color component values per pixel, or may be a greyscale image with a single color (greyscale) component per pixel. Feature image(s) 312 may indicate locations of features of test image 310, where pixel values in feature images indicate the presence of a feature type at that pixel location. Each feature image 312 produced from one test image 310 may correspond to a different feature type, such as computer vision features (e.g., edges, textures, motion, etc.), or statistical features (e.g., a spatially local mean or standard deviation of pixel intensity values), and with different localizations. Feature images with different localizations may characterize a feature type using different localization techniques, such as by varying a window size around an output pixel (e.g., varying a radius from an output pixel) within which source pixels are considered local. For example, feature detector 302 may produce six feature images 312 from one test image 310 including three mean images having localization radii of 2, 3, and 4 pixels plus two standard deviation images having localization radii of 2 and 5 pixels.

In aspects, feature generator 302 may apply a convolutional filter to test image 310 in order to produce a feature image 312 for features such as: a gaussian-weighted intensity feature within a local window of various sizes in order to determine features at different scales; a gaussian-weighted local variance feature with various windows sizes; and/or a gabor filter for identifying image pattern or texture features.

Likelihood image(s) 314 may each indicate the likelihood of a corresponding object type that may be present in the image subject of test image 310. For example, each pixel value in a likelihood image may indicate an estimated probability that an object type, such as a particular cell organelle, exists at each pixel's corresponding location within test image 310. In aspects, one or more of feature images 312 may be used by likelihood generator to produce each likelihood image 314.

In one example, likelihood generator 304 may generate a likelihood image for a particular classification class with a tunable pseudo-sensitivity parameter s, by calculating the per-pixel probability as:

$$p_{class} = \frac{s \times p_{class}}{(1-s) \times p_{bkg} + s \times p_{class}}$$

where s=sensitivity, $p_{class}$=the probability a pixel belongs to a classification class, and $p_{bkg}$=a maximum of the probabilities that a pixel belongs to any background classification (e.g., any classification other than class).

The probably that a pixel belongs to a classification may be determined based on a multivariate statistical distribution model generated from manually annotated training images. Such a model may model each classification as a normal distribution using full covariance matrices. Training images may including manual annotation for distinguishing between background and foreground pixel classifications, or between background, cell-edge, and cell-center pixel classifications.

In an aspect, improved pixel detection techniques can include techniques for faster and/or more efficient processing. For example, performance can be improved during generation of classification images 316 by parallelizing the calculation of $p_{class}$ by processing the multivariate statistical model with single instruction multiple data (SIMD) parallelism.

Pixel classifier 306 may combine likelihood images 314 into the classification image 316 to indicate which, if any object types are detected at corresponding pixel of test image 310. Pixel classifier 306 may, for example, select which of the object types is mostly likely to exist at each pixel location. Alternately, pixel classifier 306 may indicate a count of objects detected at each pixel, or each pixel may indicate a which combination of objects are detected at each pixel (for example, using different colors to indicate presence of different object types). In some embodiments, pixel classifier may use a likelihood threshold to determine if an object type exists at a pixel location.

Figure 4:
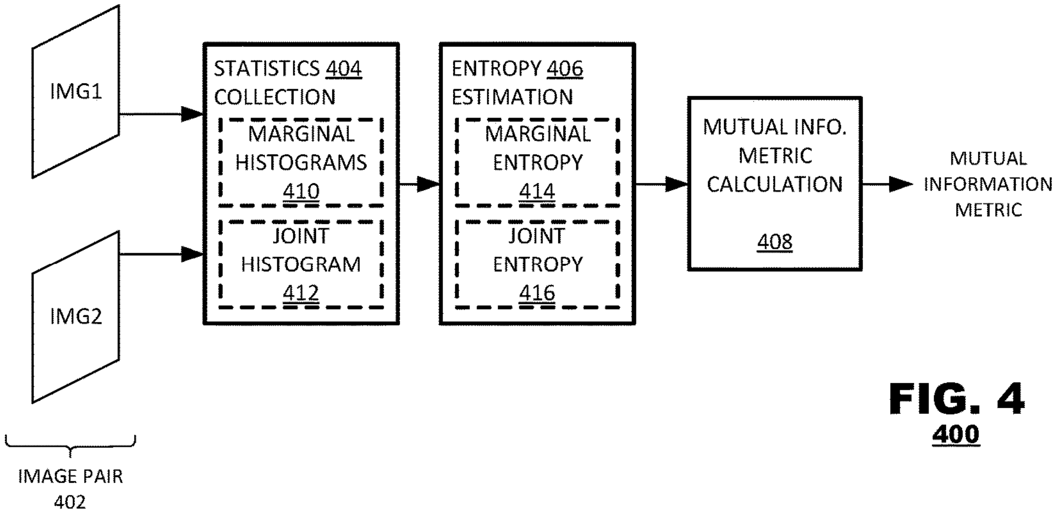
FIG. 4 illustrates an example mutual information measurement system according to aspects of the subject technology.

FIG. 4 illustrates an example mutual information measurement system 400 according to aspects of the subject technology. System 400 can be an example implementation of mutual information measurement unit 208 (FIG. 2). System 400 includes a statistics collection unit 404, entropy estimate unit 406, and a mutual information metric calculation unit 408. In operation, statistic collection unit 404 can collect statistics of pixel data in an image pair 402. Entropy estimation unit 406 can estimate entropy in the image pair 402 based on the statistics collected by statistics collection unit 404. Mutual information metric calculation unit 408 can calculate a mutual information metric of the image pair 402 based on the entropy estimated by entropy estimation unit 406.

In optional aspects of system 400, statistics collection unit 404 can include a marginal histogram unit 410 and a joint histogram unit 412. Entropy estimation unit 406 can include marginal entropy unit 414 and joint entropy unit 416. In an aspect, marginal entropy estimation in box 414 may be based on marginal histograms from box 410, while joint entropy estimation in box 416 may be based on joint histograms from box 412. In an aspect, a joint histogram for image pair 402 may count the frequency of occurrence of co-located pixel values in the two images. For example, each entry in a joint histogram may indicate a count of pixels in the image pair for which one image of the pair has a first pixel value and the corresponding co-located pixel in the other image has a second pixel value.

In some implementations, the mutual information metric between two images may be normalized based on an individual estimate of entropy of each of the two images. For example, normalized mutual information $I_{norm}$ may be calculated as $$I_{norm} = \frac{I(X;Y)}{\sqrt{H(X)H(Y)}}$$

where I(X;Y) is the mutual information between images X and Y, and H(X) is the individual entropy of image X.

Figure 5:
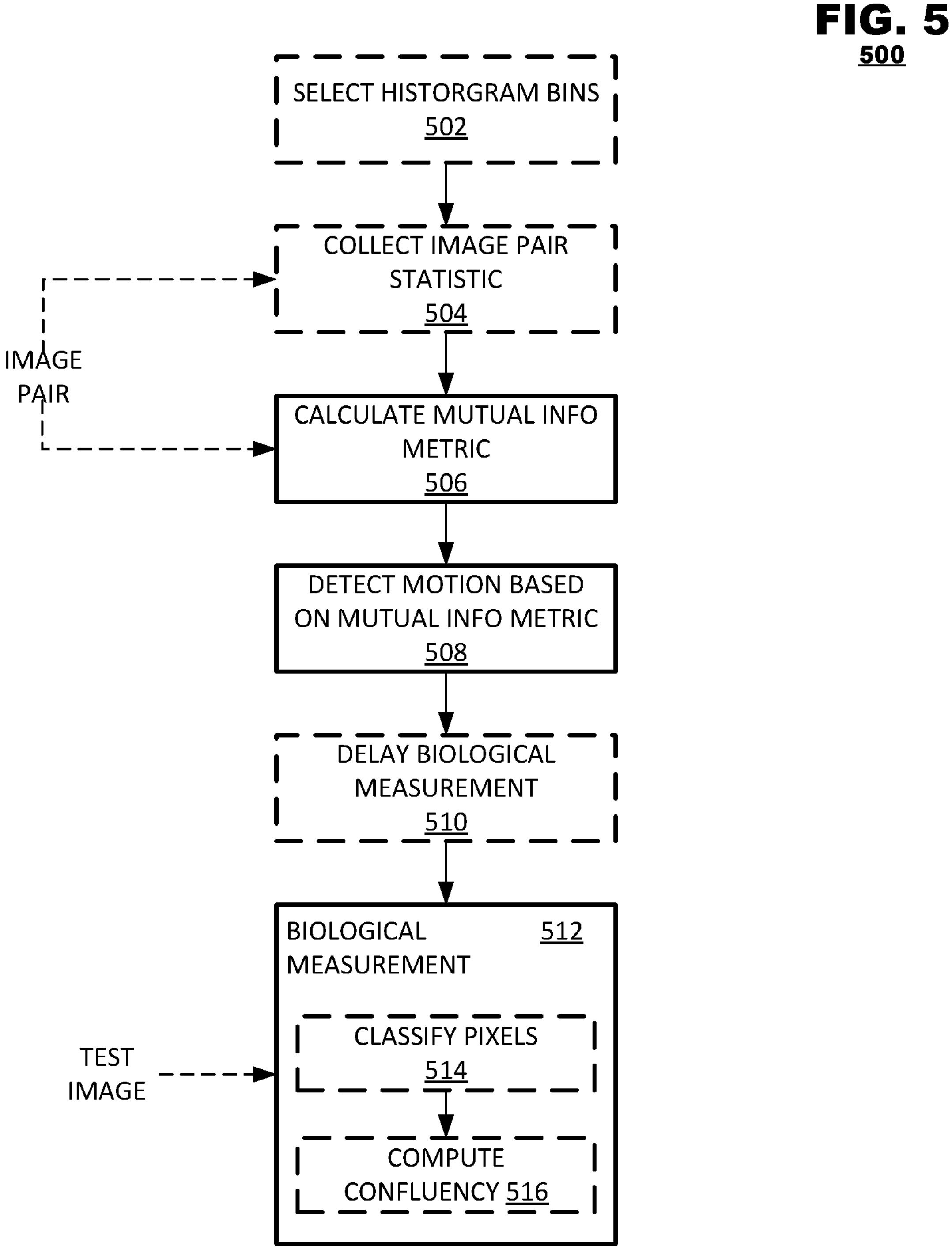
FIG. 5 illustrates an example method for biological measurement according to aspects of the subject technology.

FIG. 5 illustrates an example method 500 for biological measurement according to aspects of the subject technology. Method 500 can be an example method performed by image processor 106 (FIG. 1) or system 200 (FIG. 2). Method 500 includes calculating a mutual information metric (506) from a pair of images, detecting motion based on the calculated mutual information metric, (508), and performing a biological measurement of an image subject in a test image (box 512).

A mutual information metric may be based on based on Shannon's definition of entropy H and mutual information I(X;Y). In operation of an example implementation, a mutual information metric (506) can be based on statistic collection and entropy estimation as described above regarding mutual information measurement system 400 (FIG. 4). In an aspect, statistics of an image pair may be collected (box 504), such as described above regarding FIG. 4, and these statistics may be based on a selected bin size for histograms (502).

Motion may be detected (508), for example, when the mutual information metric drops below a threshold level indicating that one image in the pair is not well predicted by the other image in the pair. In an aspect, performance of a biological measurement (512) may be delayed (510) for some time period following initial detection of motion (508). For example, after initial detection of motion, the biological measurement (512) may not be initiated until after motion is no longer detected. In an aspect, a first threshold of the mutual information metric may be used to detect when motion starts, while a second threshold of the mutual information metric may be used to detect when motion stops. Alternately or in addition, a fixed or variable time delay may be added before initiating a biological measurement. For example, a biological measurement may be initiated 3 seconds after motion is first detected, or a biological measurement may be initiated 2 seconds after motion is no longer detected.

In operation, performing the biological measurement (512) may optionally include classifying pixels (514) and computing a confluency (516) based on the pixel classification.

Figure 6:
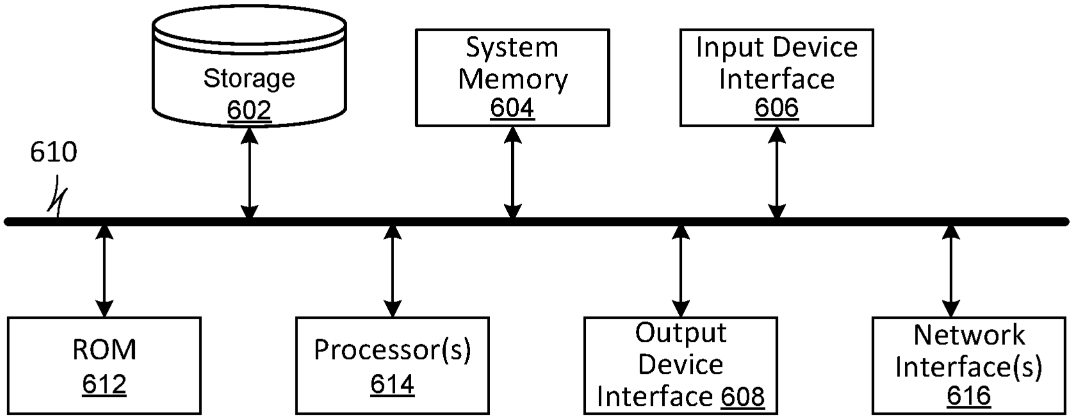
FIG. 6 illustrates an example computing device according to aspects of the subject technology.

FIG. 6 illustrates an example computing device 600 with which aspects of the subject technology can be implemented in accordance with one or more implementations, including, for example systems 200, 300, 400 (FIGS. 2-4) and method 500 (FIG. 5). The computing device 600 can be, and/or can be a part of, any computing device or server for generating the features and processes described above, including but not limited to a laptop computer, a smartphone, a tablet device, a wearable device such as a goggles or glasses, an earbud or other audio device, a case for an audio device, and the like. The computing device 600 can include various types of computer readable media and interfaces for various other types of computer readable media. The computing device 600 includes a permanent storage device 602, a system memory 604 (and/or buffer), an input device interface 606, an output device interface 608, a bus 610, a ROM 612, one or more processing unit(s) 614, one or more network interface(s) 616, and/or subsets and variations thereof.

The bus 610 collectively represents all system, peripheral, and chipset buses that communicatively connect the numerous internal devices of the computing device 600. In one or more implementations, the bus 610 communicatively connects the one or more processing unit(s) 614 with the ROM 612, the system memory 604, and the permanent storage device 602. From these various memory units, the one or more processing unit(s) 614 retrieves instructions to execute and data to process in order to execute the processes of the subject disclosure. The one or more processing unit(s) 614 can be a single processor or a multi-core processor in different implementations.

The ROM 612 stores static data and instructions that are needed by the one or more processing unit(s) 614 and other modules of the computing device 600. The permanent storage device 602, on the other hand, can be a read-and-write memory device. The permanent storage device 602 can be a non-volatile memory unit that stores instructions and data even when the computing device 600 is off. In one or more implementations, a mass-storage device (such as a magnetic or optical disk and its corresponding disk drive) can be used as the permanent storage device 602.

In one or more implementations, a removable storage device (such as a floppy disk, flash drive, and its corresponding disk drive) can be used as the permanent storage device 602. Like the permanent storage device 602, the system memory 604 can be a read-and-write memory device. However, unlike the permanent storage device 602, the system memory 604 can be a volatile read-and-write memory, such as random-access memory. The system memory 604 can store any of the instructions and data that one or more processing unit(s) 614 may need at runtime. In one or more implementations, the processes of the subject disclosure are stored in the system memory 604, the permanent storage device 602, and/or the ROM 612. From these various memory units, the one or more processing unit(s) 614 retrieves instructions to execute and data to process in order to execute the processes of one or more implementations.

The bus 610 also connects to the input and output device interfaces 606 and 608. The input device interface 606 enables a user to communicate information and select commands to the computing device 600. Input devices that can be used with the input device interface 606 can include, for example, alphanumeric keyboards and pointing devices (also called "cursor control devices"). The output device interface 608 can enable, for example, the display of images generated by computing device 600. Output devices that can be used with the output device interface 608 can include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations can include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 610 also couples the computing device 600 to one or more networks and/or to one or more network nodes through the one or more network interface(s) 616. In this manner, the computing device 600 can be a part of a network of computers, e.g., a local area network ("LAN"), a wide area network ("WAN"), an Intranet, or a network of networks, such as the Internet. Any or all components of the computing device 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes can be rearranged, or that all illustrated blocks be performed. Any of the blocks can be performed simultaneously. In one or more implementations, multitasking and parallel processing can be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component can also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) can apply to all configurations, or one or more configurations. A disclosure relating to such phrase(s) can provide one or more examples. A phrase such as an aspect or some aspects can refer to one or more aspects and vice versa, and this applies similarly to other foregoing phrases.

The word “exemplary” is used herein to mean “serving as an example, instance, or illustration.” Any embodiment described herein as “exemplary” or as an “example” is not necessarily to be construed as preferred or advantageous over other implementations. Furthermore, to the extent that the term “include,” “have,” or the like is used in the description or the claims, such term is intended to be inclusive in a manner similar to the term “comprise” as “comprise” is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase “means for” or, in the case of a method claim, the element is recited using the phrase “step for.”

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean “one and only one” unless specifically so stated, but rather “one or more”. Unless specifically stated otherwise, the term “some” refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An image processing method, comprising:

determining a metric of mutual information between at least a pair of images from a sequence of images of a biological sample;

detecting a motion of the biological sample based on the metric of mutual information; and after the motion is detected, performing a measurement of the biological sample based on a test image of the sequence of images.

2. The image processing method of claim 1, further comprising:

when the motion is not detected, foregoing the performing of the measurement of the biological sample.

3. The image processing method of claim 1, wherein the determining the metric of mutual information comprises estimating a measure of statistical independence between co-located pixel values in the pair of images.

4. The image processing method of claim 3, wherein the estimating the measure of a statistical independence comprises determining a joint histogram of the co-located pixel values.

5. The image processing method of claim 1, wherein the motion is detected when the metric of mutual information is passes a threshold level of mutual information.

6. The image processing method of claim 1, wherein the motion is detected based on a plurality of metrics of mutual information, each metric of the plurality between different pairs of images from the sequence of images.

7. The image processing method of claim 1, wherein the performing a measurement of the biological sample is delayed after the motion is detected until after the motion is no longer detected.

8. The image processing method of claim 1, wherein the performing the measurement of the biological sample comprises:

processing the test image with a machine learning model to produce the measurement of the biological sample.

9. The image processing method of claim 1, wherein the performing the measurement of the biological sample comprises:

analyzing the test image from the sequence of images to produce a plurality of feature images;

deriving, from the feature images, a likelihood image for each of a plurality of object types; and combining the likelihood images into a classification image indicating which of the plurality of object types are detected at each pixel in the classification image.

10. The image processing method of claim 9, further comprising:

calculating a confluency metric for an object type based on a percentage of pixels in the classification image indicating the object type.

11. The image processing method of claim 9, wherein the plurality of feature images includes a mean image having pixel values each based on a mean of a neighborhood of pixels in the test image and includes a standard deviation image having pixel values each based on a standard deviation of a neighborhood of pixels in the test image.

12. The image processing method of claim 1, wherein the sequence of images of the biological sample are a sequence of transmitted light images captured by a camera with illumination behind the biological sample.

13. An image processing device, comprising a controller configured to cause:

determining a metric of mutual information between at least a pair of images from a sequence of images of a biological sample;

detecting motion in the biological sample based on the metric of mutual information; and after the motion is detected, performing a measurement of the biological sample based on a test image of the sequence of images.

14. The image processing device of claim 13, further comprising:

an image sensor for capturing the sequence of images; and a user interface for providing information to a user based on the measurement of the biological sample.

15. The image processing device of claim 13, wherein the performing the measurement of the biological sample comprises:

processing the test image with a machine learning model to produce the measurement of the biological sample.

16. The image processing device of claim 13, wherein the performing the measurement of the biological sample comprises:

analyzing the test image from the sequence of images to produce a plurality of feature images;

deriving, from the feature images, a likelihood image for each of a plurality of object types; and combining the likelihood images into a classification image indicating which of the plurality of object types are detected at each pixel in the classification image.

17. The image processing device of claim 13, wherein the controller is further configured to cause:

calculating a confluency metric for an object type based on a percentage of pixels in the classification image indicating the object type.

18. A non-transitory computer readable memory storing instructions that, when executed by a processor, cause the processor to:

determine a metric of mutual information between at least a pair of images from a sequence of images of a biological sample;

detect a motion of the biological sample based on the metric of mutual information; and after the motion is detected, perform a measurement of the biological sample based on a test image of the sequence of images.

19. The computer readable memory of claim 18, wherein the performing the measurement of the biological sample comprises:

processing the test image with a machine learning model to produce the measurement of the biological sample.

20. The computer readable memory of claim 18, wherein the performing the measurement of the biological sample comprises:

analyzing the test image from the sequence of images to produce a plurality of feature images;

deriving, from the feature images, a likelihood image for each of a plurality of object types; and combining the likelihood images into a classification image indicating which of the plurality of object types are detected at each pixel in the classification image.

* * * * *